(12) United States Patent
Wang et al.

(10) Patent No.: US 11,512,865 B2
(45) Date of Patent: Nov. 29, 2022

(54) AIR OUTLET STRUCTURE, AIR OUTLET METHOD FOR AIR CONDITIONER, AND AIR CONDITIONER

(71) Applicant: Gree Electric Appliances, Inc. of Zhuhai, Guangdong (CN)

(72) Inventors: Xianlin Wang, Guangdong (CN); Hui Zhang, Guangdong (CN); Zhi Meng, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 598 days.

(21) Appl. No.: 16/491,111

(22) PCT Filed: Oct. 16, 2017

(86) PCT No.: PCT/CN2017/106284
§ 371 (c)(1),
(2) Date: Sep. 4, 2019

(87) PCT Pub. No.: WO2018/166197
PCT Pub. Date: Sep. 20, 2018

(65) Prior Publication Data
US 2020/0018512 A1 Jan. 16, 2020

(30) Foreign Application Priority Data
Mar. 17, 2017 (CN) .......................... 201710161275.7

(51) Int. Cl.
*F24F 11/70* (2018.01)
*F24F 13/14* (2006.01)
(Continued)

(52) U.S. Cl.
CPC ............ *F24F 11/70* (2018.01); *F24F 1/0014* (2013.01); *F24F 13/10* (2013.01);
(Continued)

(58) Field of Classification Search
CPC .................. F24F 13/10; F24F 13/1426; F24F 2013/1446; F24F 1/0014
(Continued)

(56) References Cited

U.S. PATENT DOCUMENTS

2003/0213853 A1* 11/2003 Demster ................... F24F 7/08
454/239
2007/0023181 A1* 2/2007 Sawamukai ......... B60H 1/0005
165/42
(Continued)

FOREIGN PATENT DOCUMENTS

CN 103322661 A 9/2013
CN 205066093 U 3/2016
(Continued)

OTHER PUBLICATIONS

The supplementary European search report for Application No. 17901132.5, dated Mar. 27, 2020, European Patent Office, Germany (12 pages).

(Continued)

*Primary Examiner* — Ko-Wei Lin
(74) *Attorney, Agent, or Firm* — McAndrews, Held & Malloy, Ltd.

(57) ABSTRACT

Disclosed are an air outlet structure, an air outlet method for an air conditioner, and the air conditioner. The air outlet structure may include: a main air outlet channel, a main air outlet, an auxiliary air outlet and an adjusting device; the main air outlet and the auxiliary air outlet are communicated with the main air outlet channel; the adjusting device is provided between the main air outlet channel and the auxiliary air outlet as to make the main air outlet channel send out air through the main air outlet and/or the auxiliary air outlet. With the above structure, the air conditioner may have a broad air supplying scope and a uniform air speed and supply the air to an entire plane, and comfort of the air (Continued)

conditioner may be improved. Thus, the problem that an existing air conditioner has non-uniform air outlet effect may be effectively solved.

10 Claims, 4 Drawing Sheets

(51) Int. Cl.
*F24F 1/0014* (2019.01)
*F24F 13/10* (2006.01)
*B60H 1/00* (2006.01)
*F24F 13/22* (2006.01)

(52) U.S. Cl.
CPC ...... *F24F 13/1426* (2013.01); *B60H 1/00871* (2013.01); *B60H 2001/00721* (2013.01); *F24F 13/22* (2013.01); *F24F 2013/1446* (2013.01)

(58) Field of Classification Search
USPC .......................................................... 454/333
See application file for complete search history.

(56) References Cited

U.S. PATENT DOCUMENTS

| | | | | |
|---|---|---|---|---|
| 2009/0186572 A1* | 7/2009 | Farrell | ............... | F24F 13/06 454/333 |
| 2009/0229289 A1* | 9/2009 | Ohmae | ............... | F24F 1/0014 62/259.1 |
| 2010/0011799 A1* | 1/2010 | Sakakibara | ......... | B60H 1/3414 165/104.34 |
| 2010/0043470 A1* | 2/2010 | Kang | ............... | B60H 1/00064 62/239 |
| 2012/0266975 A1* | 10/2012 | Kelly | ............... | E04B 1/7053 137/357 |
| 2012/0298330 A1* | 11/2012 | Mysse, III | ............. | H05K 7/206 165/96 |
| 2013/0210336 A1* | 8/2013 | Ludi | ............... | F24F 13/068 454/252 |
| 2015/0075201 A1* | 3/2015 | Park | ............... | F25D 23/006 454/324 |
| 2015/0354845 A1* | 12/2015 | Brown | ............... | F24F 11/72 236/51 |
| 2016/0131393 A1* | 5/2016 | Zheng | ............... | F24F 13/10 454/202 |
| 2016/0263963 A1* | 9/2016 | Sato | ............... | F24F 13/12 |
| 2016/0370029 A1* | 12/2016 | Kurelowech | ......... | F24F 12/006 |
| 2017/0320372 A1* | 11/2017 | Aizawa | ............. | B60H 1/00521 |
| 2017/0321940 A1* | 11/2017 | Ikawa | ............... | F24F 11/74 |
| 2017/0326947 A1* | 11/2017 | Sakamoto | ......... | B60H 1/00342 |
| 2018/0201093 A1* | 7/2018 | Marumo | ............ | B60H 1/00807 |
| 2018/0251009 A1* | 9/2018 | Fujii | ................ | B60H 1/00885 |
| 2018/0306452 A1* | 10/2018 | Kim | ................ | F24F 13/20 |
| 2018/0363927 A1* | 12/2018 | Shirota | ............... | F24F 1/0057 |

FOREIGN PATENT DOCUMENTS

| | | | |
|---|---|---|---|
| CN | 105588207 | A | 5/2016 |
| CN | 105698353 | A | 6/2016 |
| CN | 105928074 | A | 9/2016 |
| CN | 106949615 | A | 7/2017 |
| CN | 206626777 | U | 11/2017 |
| EP | 0 411 247 | A2 | 2/1991 |
| JP | 2006226672 | * | 8/2006 |
| JP | 2006226672 | A | 8/2006 |
| WO | 2016/197747 | A1 | 12/2016 |

OTHER PUBLICATIONS

Communication pursuant to Article 94(3) EPC for European Application No. 17 901 132.5, dated Mar. 22, 2022, European Patent Office, Germany (7 pages).

* cited by examiner

AIR OUTLET STRUCTURE, AIR OUTLET METHOD FOR AIR CONDITIONER, AND AIR CONDITIONER

CROSS-REFERENCE TO RELATED DISCLOSURES

This application is a 371 of International Patent Application No. PCT/CN2017/106284, filed Oct. 16, 2017, which claims benefit of Chinese Patent Application No. 201710161275.7, filed on Mar. 17, 2017, entitled "Air Outlet Structure, Air Outlet Method for Air Conditioner, and Air Conditioner", the contents both of which are hereby incorporated by reference in their entirety.

TECHNICAL FIELD

The disclosure relates to the field of air conditioning devices, and in particular to an air outlet structure, an air outlet method for an air conditioner and the air conditioner.

BACKGROUND

At present, requirements of people to properties and comfort of an air conditioner become higher and higher along with the development of economy and improvement of living standard.

However, a stationary air outlet is applied to an existing air conditioner, and the stationary air outlet is provided with an upper air deflector and a lower air deflector to adjust an air supplying scope. Such an air outlet structure greatly limits the air supplying scope of the air conditioner; furthermore, an air speed is not uniform, and accordingly experiences of a user are degraded.

SUMMARY

A main objective of some embodiments of the disclosure is to provide an air outlet structure, an air outlet method for an air conditioner and the air conditioner, as to at least solve the problem that the air outlet of the air conditioner in a related technology has non-uniform air outlet effect.

In order to achieve the above objective, in accordance with an embodiment of the disclosure, there is provided an air outlet structure, which may include a main air outlet channel and a main air outlet connecting with the main air outlet channel. Herein, the air outlet structure may further include an auxiliary air outlet, communicating with the main air outlet channel; an adjusting device, provided between the main air outlet channel and the auxiliary air outlet, and used for adjusting connection/disconnection between the main air outlet channel and the main air outlet and connection/disconnection between the main air outlet channel and the auxiliary air outlet, as to make the main air outlet channel send out air through the main air outlet, or through the auxiliary air outlet, or both through the main air outlet 20 and the auxiliary air outlet.

In an exemplary embodiment, the auxiliary air outlet is provided on a panel of an air conditioner.

In an exemplary embodiment, the auxiliary air outlet may include multiple first air holes which are provided on the panel at intervals, as to make the panel send out the air through the first air holes.

In an exemplary embodiment, an auxiliary air outlet channel is provided between the auxiliary air outlet and the main air outlet channel, and the auxiliary air outlet is communicated with the main air outlet channel through the auxiliary air outlet channel.

In an exemplary embodiment, the auxiliary air outlet channel is provided between the panel and a panel body of the air conditioner.

In an exemplary embodiment, the adjusting device may include a first air deflector, provided between the auxiliary air outlet channel and the main air outlet channel in a foldable manner. Herein, the main air outlet channel is communicated with the auxiliary air outlet channel when the first air deflector moves to a first preset position, and the main air outlet channel is disconnected with the auxiliary air outlet channel by the first air deflector when the first air deflector moves to a second preset position.

In an exemplary embodiment, the first air deflector is rotatably configured, as to make the main air outlet channel connect or disconnect with the auxiliary air outlet channel.

In an exemplary embodiment, the first air deflector is provided with a zigzag structure.

In an exemplary embodiment, the air outlet structure may further include a drive motor. The drive motor is connected with the first air deflector in a driving manner, as to drive the first air deflector to move to the first preset position or the second preset position.

In an exemplary embodiment, the adjusting device may further include a second air deflector, provided at the main air outlet in a foldable manner. Herein, the second air deflector is communicated with the first air deflector by a linkage rib in a transmission manner. When the second air deflector opens the main air outlet, the linkage rib drives the first air deflector to move to the second preset position. When the second air deflector closes the main air outlet, the linkage rib drives the first air deflector to move to the first preset position.

In an exemplary embodiment, the linkage rib may include a first linkage rib, provided on an end of the first air deflector; and a second linkage rib, provided on an end of the second air deflector. Herein, the second linkage rib is connected with the first linkage rib in the transmission manner.

In an exemplary embodiment, both ends of the second air deflector are provided with the linkage ribs.

In an exemplary embodiment, the second air deflector is provided with multiple second air holes for sending out the air.

In accordance with an exemplary embodiment of the disclosure, there is provided an air outlet method for an air conditioner. The air outlet method is applied to an air outlet structure of the above contents. The air outlet method may include: an adjusting device is controlled, as to communicate a main air outlet channel with a main air outlet, disconnect the main air outlet channel with an auxiliary air outlet, and accordingly make the air conditioner send out air through the main air outlet; or the adjusting device is controlled, as to communicate the main air outlet channel with the auxiliary air outlet, disconnect the main air outlet channel with the main air outlet, and accordingly make the air conditioner send out the air through the auxiliary air outlet; or the adjusting device is controlled, as to communicate the main air outlet channel with the auxiliary air outlet and the main air outlet, and accordingly make the air conditioner send out the air through the auxiliary air outlet and the main air outlet.

In accordance with an exemplary embodiment of the disclosure, there is provided an air conditioner, which may include an air outlet structure. The air outlet structure is the one of those described above.

The air outlet structure to which the technical solution of the disclosure is applied may include a main air outlet channel, a main air outlet, an auxiliary air outlet and an adjusting device. The main air outlet is communicated with the main air outlet channel, and the auxiliary air outlet is communicated with the main air outlet channel. The adjusting device is provided between the main air outlet channel and the auxiliary air outlet, for adjusting connection/disconnection between the main air outlet channel and the main air outlet and connection/disconnection between the main air outlet channel and the auxiliary air outlet, as to make the main air outlet channel send out air through the main air outlet and/or the auxiliary air outlet. In this way, the air of the air conditioner may be sent out from a position of a traditional main air outlet, and the air outlet channel may be adjusted through the adjusting device. Accordingly, the air of the air conditioner may be sent out from the auxiliary air outlet, the air conditioner may have a broad air supplying scope and a uniform air speed and supply the air to an entire plane, so that comfort of the air conditioner may be greatly improved. Thus, the problem that the air outlet of the air conditioner in the related technology has non-uniform air outlet effect may be effectively solved.

Besides the above objective, characteristics and advantages, the disclosure may further include other objectives, characteristics and advantages. The disclosure will be described in detail below in combination with the drawings.

BRIEF DESCRIPTION OF THE DRAWINGS

The accompanying drawings, which constitute a part of the disclosure, are used to provide a further understanding of the disclosure, and exemplary embodiments of the disclosure and the description thereof are used to explain the disclosure, but do not constitute improper limitations to the disclosure. In the drawings.

Herein, the above drawings include the following reference numbers:

10. Main air outlet channel; 20. Main air outlet; 30. Auxiliary air outlet; 40. Adjusting device; 41. First air deflector; 42. Second air deflector; 43. Drive motor; 44. Gear set; 45. Crank; 46. First air outlet; 47. Second air outlet; 50. Panel; 60. Auxiliary air outlet channel; 70. Panel body; 80. Linkage rib; 81. First linkage rib; 82. Second linkage rib.

DETAILED DESCRIPTION OF THE EMBODIMENTS

It is to be noted that embodiments in the disclosure and characteristics in the embodiments may be combined with each other on the premise that no conflict occurs. The disclosure will be described in detail below by using drawings for reference and in combination with the embodiments.

In order to make the solutions of the disclosure better understood by those skilled in the art, the technical solutions in the embodiments of the disclosure will be clearly and completely described below in combination with the drawings in the embodiments of the disclosure. It is apparent that the described embodiments are not all but part of the embodiments of the disclosure. All other embodiments obtained by those of ordinary skilled in the art on the basis of the embodiments in the disclosure without creative work should fall within the scope of protection of the disclosure.

Figure 1:
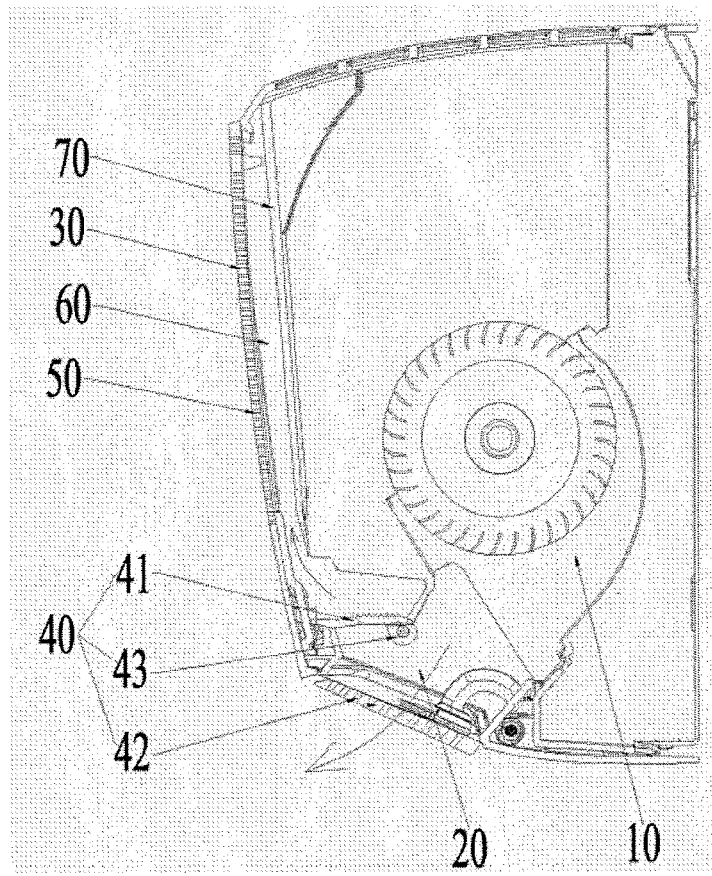
FIG. 1 is a schematic diagram of a structural layout of an optional air outlet structure in accordance with an embodiment of the disclosure on an air conditioner.
Figure 2:
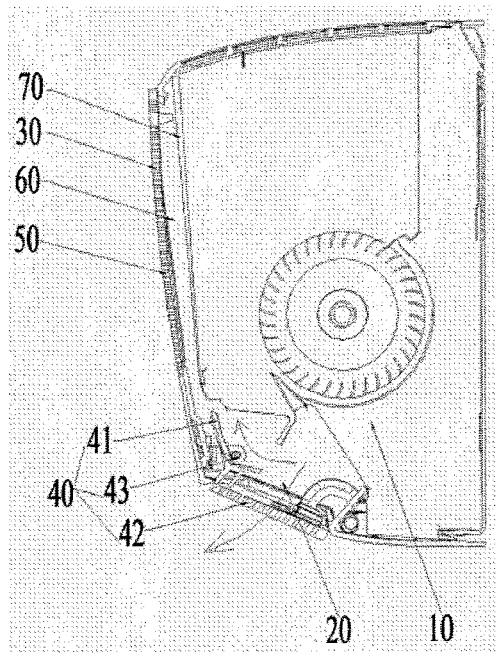
FIG. 2 is a schematic diagram of a structural layout of another optional air outlet structure in accordance with an embodiment of the disclosure on an air conditioner.

An air outlet structure in accordance with an embodiment of the disclosure, as shown in FIG. 1 and FIG. 2, may include a main air outlet channel 10 and a main air outlet 20 connecting with the main air outlet channel 10. The air outlet structure may further include an auxiliary air outlet 30, communicating with the main air outlet channel 10; an adjusting device 40, provided between the main air outlet channel 10 and the auxiliary air outlet 30, and used for adjusting connection/disconnection between the main air outlet channel 10 and the main air outlet 20 and connection/disconnection between the main air outlet channel 10 and the auxiliary air outlet 30, as to make the main air outlet channel 10 send out air through the main air outlet 20, or through the auxiliary air outlet 30, or both through the main air outlet 20 and the auxiliary air outlet 30.

The air outlet structure to which the technical solution of the disclosure is applied may include the main air outlet channel 10, the main air outlet 20, the auxiliary air outlet 30 and the adjusting device 40. The main air outlet 20 is communicated with the main air outlet channel 10, and the auxiliary air outlet 30 is communicated with the main air outlet channel 10. The adjusting device 40 is provided between the main air outlet channel 10 and the auxiliary air outlet 30, for adjusting the connection/disconnection between the main air outlet channel 10 and the main air outlet 20 and the auxiliary air outlet 30, as to make the main air outlet channel 10 send out the air through the main air outlet 20, or through the auxiliary air outlet 30, or both through the main air outlet 20 and the auxiliary air outlet 30. In this way, the air of an air conditioner may be sent out from a position of the traditional main air outlet 20, and the air outlet channel may be adjusted through the adjusting device 40. Accordingly, the air of the air conditioner may be sent out from the auxiliary air outlet 30, the air conditioner may have a broad air supplying scope and a uniform air speed and supply the air to an entire plane, so that comfort of the air conditioner may be greatly improved. Thus, the problem that the air outlet of the air conditioner in the related technology has non-uniform air outlet effect may be effectively solved.

In specific embodiment, the main air outlet 20 is provided at a lower end of a shell of the air conditioner, and the auxiliary air outlet 30 is provided on a panel 50 of the air conditioner. In order to guide the air of the main air outlet channel 10 to the auxiliary air outlet 30, an auxiliary air outlet channel 60 is further provided between the auxiliary air outlet 30 and the main air outlet channel 10, and the auxiliary air outlet 30 is communicated with the main air outlet channel 10 through the auxiliary air outlet channel 60. The auxiliary air outlet channel 60 is provided between the panel 50 and a panel body 70 of the air conditioner and extends along a gap between an inner wall of the panel 50 and the panel body 70.

Figure 3:
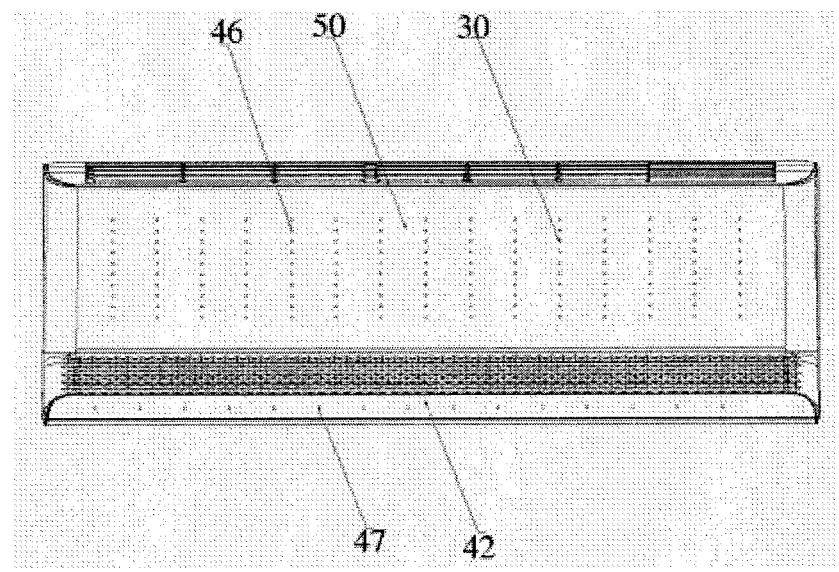
FIG. 3 is a front view of an optional air conditioner in accordance with an embodiment of the disclosure.

In order to ensure uniform air outlet effect of the auxiliary air outlet 30, as shown in FIG. 3, the auxiliary air outlet 30 may further include multiple first air holes 46, distributed on the panel 50 at intervals in a form of array. In this way, the air of the auxiliary air outlet 30 may be sent out through each of the first air holes 46, thereby improving the air supplying scope and comfort of the air conditioner.

In order to flexibly control an air outlet mode of the main air outlet 20 and the auxiliary air outlet 30, as shown in FIG. 1 and FIG. 2, the adjusting device 40 may include a first air deflector 41, provided between the auxiliary air outlet channel 60 and the main air outlet channel 10 in a foldable manner. Specifically, a bottom shell of the air conditioner between the auxiliary air outlet channel 60 and the main air outlet channel 10 is provided with an articulated shaft, one end of the first air deflector 41 is provided with a shaft sleeve, and the first air deflector 41 is rotatably sleeved on the articulated shaft by the shaft sleeve. In this way, the auxiliary air outlet channel 60 is connected or disconnected with the main air outlet channel 10. When the first air deflector 41 rotates to a first preset position, a transitional part of the auxiliary air outlet channel 60 and the main air outlet channel 10 is completely opened, and the main air outlet channel 10 is communicated with the auxiliary air outlet channel 60. When the first air deflector 41 rotates to a second preset position, the transitional part of the auxiliary air outlet channel 60 and the main air outlet channel 10 is completely blocked, and the main air outlet channel 10 is disconnected with the auxiliary air outlet channel 60 by the first air deflector 41.

The first air deflector 41 is provided with a zigzag structure. Specifically, the zigzag structure is provided on a surface of the first air deflector 41 facing one side of the auxiliary air outlet 30, with main effects of preventing condensation and reducing noise.

Specifically, when the first air deflector 41 is located at the first preset position, the first air deflector 41 may rotate to a non-horizontal position; at this time, the auxiliary air outlet channel 60 may be opened, and the air may be sent out from micro holes (namely, the first air holes 46) on the panel 50. When the first air deflector 41 is located at the second preset position, the first air deflector 41 may rotate to a horizontal position; at this time, an inlet of the auxiliary air outlet channel 60 may be closed, and the air may be sent out from the main air outlet 20 only. The air outlet mode of this time may be the same as that of a traditional air conditioner.

Figure 4:
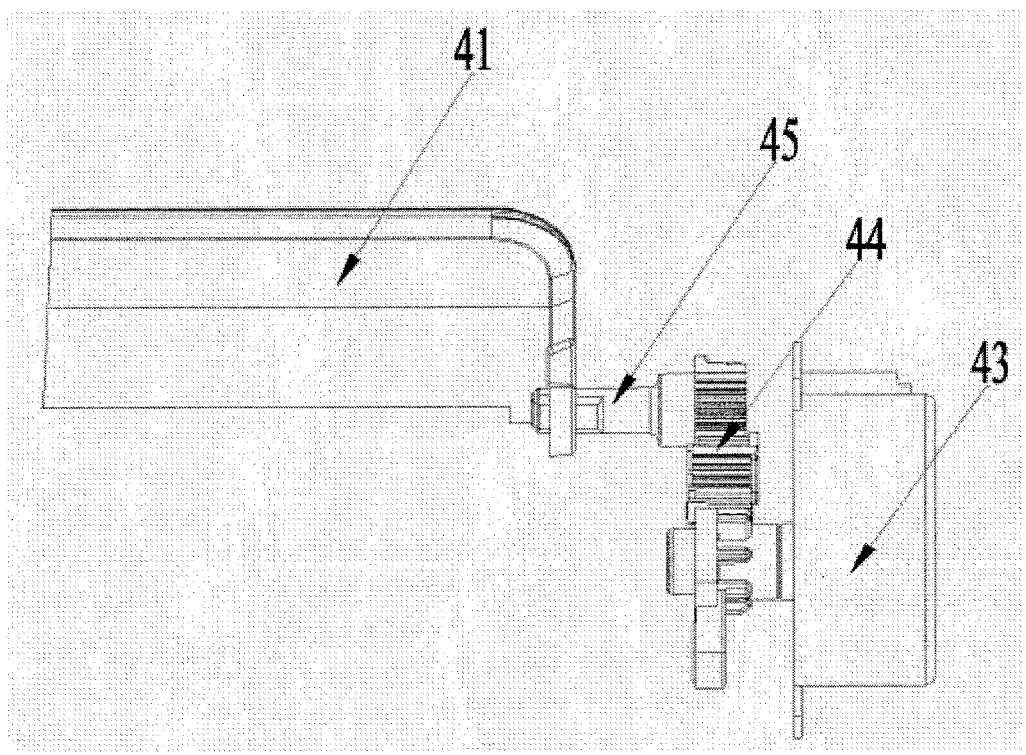
FIG. 4 is a schematic diagram of a drive structure of a first air deflector of an optional air outlet structure in accordance with an embodiment of the disclosure.

In order to control a motion of the first air deflector 41, as shown in FIG. 4, the air outlet structure may further include a drive motor 43. The drive motor 43 is connected with the first air deflector 41 in a driving manner, as to drive the first air deflector 41 to move to the first preset position or the second preset position. Specifically, a gear set 44 and a crank 45 are provided between the drive motor 43 and the first air deflector 41. One end of the crank 45 is connected with a side of a bottom end of first air deflector 41, and another end of the crank 45 is provided with a gear matching with the gear set 44. The drive motor 43 is connected with the gear on the crank 45 through the gear set 44 in the driving manner. In this way, the first air deflector 41 is driven to rotate.

Figure 5:
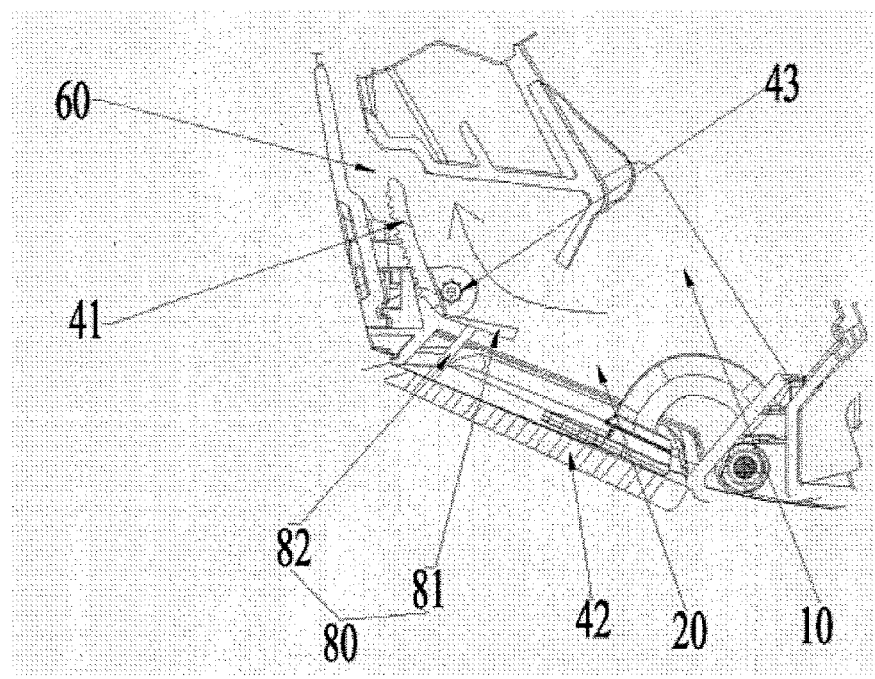
FIG. 5 is a schematic diagram of a linkage structure of a first air deflector and a second air deflector of an optional air outlet structure in accordance with an embodiment of the disclosure.

In order to adjust the air outlet mode of the main air outlet 20, as shown in FIG. 2 and FIG. 5, the adjusting device 40 may further include a second air deflector 42. One end of the second air deflector 42 is rotatably connected with a lower end of the shell of the air conditioner at a bottom through a hinge, as to open or close the main air outlet 20. A linkage rib 80 is provided between a free end of the second air deflector 42 and a hinging end of the first air deflector 41. The second air deflector 42 drives the first air deflector 41 to rotate through the linkage rib 80 during rotating. In the embodiment, the first air deflector 41 rotates, without needing to be driven by the drive motor 43.

Figure 6:
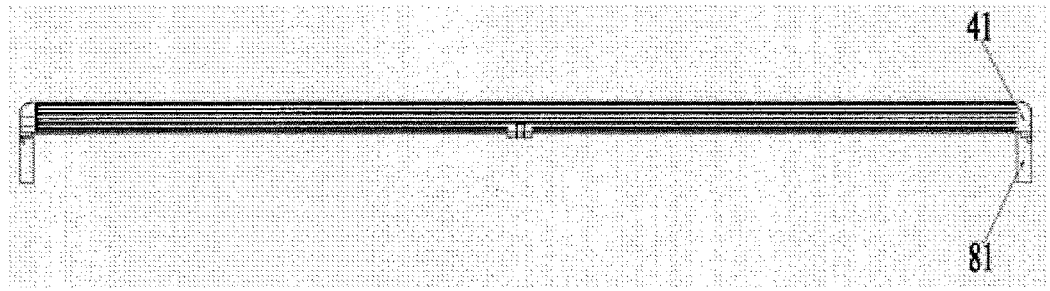
FIG. 6 is a schematic diagram of a setting structure of a first linkage rib of an optional air outlet structure in accordance with an embodiment of the disclosure on a first air deflector.
Figure 7:
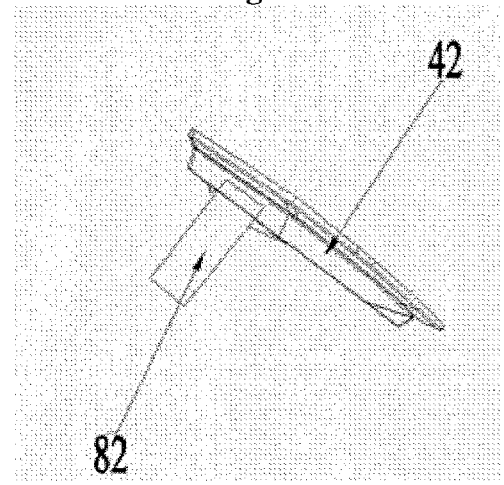
FIG. 7 is a schematic diagram of a setting structure of a second linkage rib of an optional air outlet structure in accordance with an embodiment of the disclosure on a second air deflector.

Specifically, as shown in FIG. 5 to FIG. 7, the linkage rib 80 may include a first linkage rib 81 and a second linkage rib 82. The first linkage rib 81 is provided at a rear part of the hinging end of the first air deflector 41, and both ends along a length direction of the first air deflector 41 are provided with one first linkage rib 81. The second linkage rib 82 is provided inside the free end of the second air deflector 42, and both ends along a length direction of the second air deflector 42 are provided with one second linkage rib 82. Two second linkage ribs 82 are correspondingly abutted against two first linkage ribs 81. When the second air deflector 42 rotates outward to open the main air outlet 20, the second linkage rib 82 may rotate along the second air deflector 42, supporting of the second linkage rib 82 may be unavailable for the first linkage rib 81, the first air deflector 41 may move to the second preset position in presence of a gravity, namely, the first air deflector 41 may close the auxiliary air outlet channel 60 and the main air outlet channel 10, and the air of the main air outlet channel 10 may be sent out from the main air outlet 20; or when the second air deflector 42 rotates outward to open the main air outlet 20, the second linkage rib 82 may pull the first air deflector 41 by the first linkage rib 81 to rotate to the second preset position, namely, the first air deflector 41 may close the auxiliary air outlet channel 60 and the main air outlet channel 10, and the air of the main air outlet channel 10 may be sent out completely from the main air outlet 20. In addition, when the second air deflector 42 rotates inward to close the main air outlet 20, the second linkage rib 82 may push the first air deflector 41 by the first linkage rib 81 to rotate to the first preset position, namely, the first air deflector 41 may open the auxiliary air outlet channel 60 and the main air outlet channel 10 to communicate the auxiliary air outlet channel 60 with the main air outlet channel 10, and the air of the main air outlet channel 10 may be sent out from the auxiliary air outlet 30 through the auxiliary air outlet channel 60.

It is visible that a working mode of the first air deflector 41 and the second air deflector 42 is: when the second air deflector 42 is opened, the first air deflector 41 may be closed, and the air may be sent out from the main air outlet 20; when the second air deflector 42 is closed, the second linkage rib 82 on the second air deflector 42 may hit the first linkage rib 81 on the first air deflector 41, so that the first air deflector 41 may rotate to the non-horizontal position. In this way, the auxiliary air outlet channel 60 may be opened, the air may be sent out from the micro holes on the panel 50 and the second air deflector 42, with the identical effect.

Figure 8:
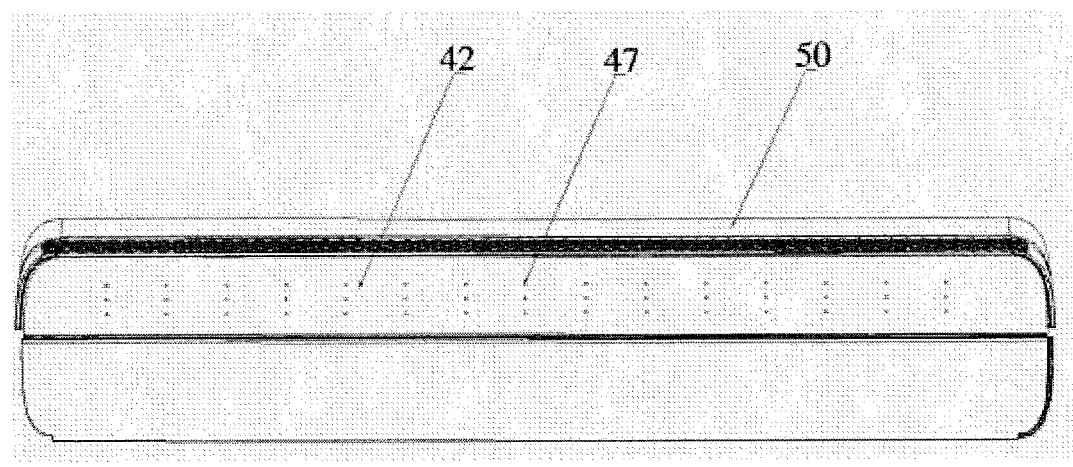
FIG. 8 is a schematic diagram of a connecting structure of a second air deflector of an optional air outlet structure in accordance with an embodiment of the disclosure and a panel.
Figure 9:
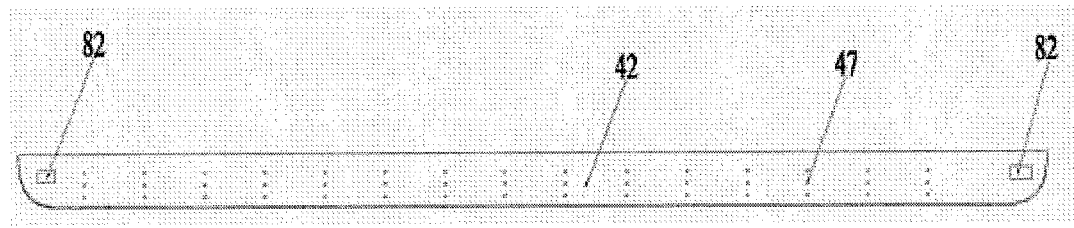
FIG. 9 is a distribution diagram of second air outlets on a second air deflector of an optional air outlet structure in accordance with an embodiment of the disclosure.

In order to uniformly send out the air when the second air deflector 42 is closed, as shown in FIG. 8 and FIG. 9, the second air deflector 42 is provided with multiple second air holes 47. The air of the main air outlet channel 10 may not only be sent out uniformly through each of the first air holes 46 on the panel 50, but each of the second air holes 47 on the second air deflector 42. When the second air deflector 42 is located at a closed position, the main air outlet 20 may send out the air through the second air holes 47 on the second air deflector 42.

The air outlet structure of the embodiment is characterized in that the micro holes are provided on the panel 50 and the second air deflector 42, namely, the first air holes 46 and the second air holes 47. The auxiliary air outlet channel 60 is provided between the panel 50 and the panel body 70. Opening and closing of the auxiliary air outlet channel 60 may be controlled through rotation of the first air deflector 41, so that the air of the air conditioner may be controlled to send out from the panel 50 or the main air outlet 20. When the first air deflector 41 rotates to the horizontal position, the auxiliary air outlet channel 60 may be closed, and the air may be sent out from the main air outlet 20. When the first air deflector 41 rotates to a vertical position, the auxiliary air outlet channel 60 may be opened, and the air of the air conditioner may not only be sent out from the position of the main air outlet, but from the micro holes on the panel 50 through the auxiliary air outlet channel 60. In this way, an objective of increasing an air outlet area may be achieved. Moreover, because the micro holes are small, the air speed of the air sent out from the micro holes is uniform, and direct blowing may be avoided.

Two schemes may be available mainly for control of opening and closing of the first air deflector 41, one of which is direct driving of the drive motor 43, and another of which is to increase the linkage rib 80 between the first air deflector 41 and the second air deflector 42.

Scheme 1: as shown in FIG. 1, the direct driving of the drive motor 43 is applied to the first air deflector 41. When the first air deflector 41 rotates to the horizontal position, the inlet of the auxiliary air outlet channel 60 may be closed, and the air of the air conditioner may be sent out from the main air outlet 20, like the traditional air conditioner. When the first air deflector 41 rotates to the non-horizontal position, the auxiliary air outlet channel 60 may be opened, and the air of the air conditioner may be sent out from the micro holes on the panel 50. Accordingly, the effect of increasing the air outlet area and sending out the air at the uniform air speed may be achieved.

Scheme 2: as shown in FIG. 2, the first air deflector 41 and the second air deflector 42 are additionally provided with one rib, respectively. When the second air deflector 42 is opened, the first air deflector 41 may be closed, the air of the air conditioner may be sent out from the main air outlet 20. When the second air deflector 42 is closed, the second linkage rib 82 on the second air deflector 42 may hit the first linkage rib 81 of the first air deflector 41, thereby making the first air deflector 41 rotate to the non-horizontal position. In this way, the auxiliary air outlet channel 60 may be opened, and the air of the air conditioner may be sent out from the micro holes on the panel 50 and the second air deflector 42 at the same time, with the identical effect.

In accordance with a second embodiment of the disclosure, there is provided an air outlet method for an air conditioner. The air outlet method is applied to the air outlet structure of the above embodiment. The air outlet method may include: an adjusting device is controlled, as to communicate a main air outlet channel with a main air outlet and disconnect the main air outlet channel with an auxiliary air outlet, and accordingly make the air conditioner send out air through the main air outlet; or the adjusting device is controlled, as to communicate the main air outlet channel with the auxiliary air outlet and disconnect the main air outlet channel with the main air outlet, and accordingly make the air conditioner send out the air through the auxiliary air outlet; or the adjusting device is controlled, as to communicate the main air outlet channel with the auxiliary air outlet and the main air outlet, and accordingly make the air conditioner send out the air through the auxiliary air outlet and the main air outlet.

With the adoption of the air outlet method for the air conditioner of the embodiment, the air of the air conditioner may be sent out from a position of a traditional air outlet 20, and the air outlet channel may be adjusted through the adjusting device 40. Accordingly, the air of the air conditioner may be sent out from the auxiliary air outlet 30, the air conditioner may have a broad air supplying scope and a uniform air speed and supply the air to an entire plane, and comfort of the air conditioner may be greatly improved. Thus, the problem that the air outlet of the air conditioner in the related technology has non-uniform air outlet effect may be effectively solved.

In accordance with a third embodiment of the disclosure, there is provided an air conditioner, which may include an air outlet structure. The air outlet structure is the one of the above embodiment. With the adoption of the air conditioner taking the air outlet structure of the above embodiment, air of the air conditioner may be sent out from a position of a traditional air outlet 20, and an air outlet channel may be adjusted through an adjusting device 40. Accordingly, the air of the air conditioner may be sent out from an auxiliary air outlet 30, the air conditioner may have a broad air supplying scope and a uniform air speed and supply the air to an entire plane, and comfort of the air conditioner may be greatly improved. Thus, the problem that the air outlet of the air conditioner in the related technology has non-uniform air outlet effect may be effectively solved.

The above is only the exemplary embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection as defined in the appended claims of the present disclosure.

What is claimed is:

1. An air outlet structure, comprising a main air outlet channel (10) and a main air outlet (20) connecting with the main air outlet channel (10), wherein the air outlet structure further comprises:
   an auxiliary air outlet (30), communicated with the main air outlet channel (10); and
   an adjusting device (40), provided between the main air outlet channel (10) and the auxiliary air outlet (30) and used for adjusting connection/disconnection between the main air outlet channel (10) and the main air outlet (20) and connection/disconnection between the main air outlet channel (10) and the auxiliary air outlet (30), as to make the main air outlet channel (10) send out air through the main air outlet (20), or through the auxiliary air outlet (30), or both through the main air outlet (20) and the auxiliary air outlet (30), the auxiliary air outlet (3) is provided on a panel (50) of an air conditioner, an auxiliary air outlet channel (60) is provided between the auxiliary air outlet (30) and the main air outlet channel (10), and the auxiliary air outlet (30) is communicated with the main air outlet channel (10) through the auxiliary air outlet channel (60), the adjusting device (40) comprises:

a first air deflector (41), provided between the auxiliary air outlet channel (60) and the main air outlet channel (10) in a foldable manner, wherein the main air outlet channel (10) is communicated with the auxiliary air outlet channel (60) when the first air deflector (41) moves to a first preset position, and the main air outlet channel (10) is disconnected with the auxiliary air outlet channel (60) by the first air deflector (41) when the first air deflector (41) moves to a second preset position, the auxiliary air outlet channel (60) is provided between the panel (50) and a panel body (70) of the air conditioner.

2. The air outlet structure as claimed in claim 1, wherein the auxiliary air outlet (30) comprises:

multiple first air holes (46), provided on the panel (50) at intervals, as to make the panel (50) to send out the air through the first air holes (46).

3. The air outlet structure as claimed in claim 1, wherein the first air deflector (41) is rotatably configured, as to make the main air outlet channel (10) connect or disconnect with the auxiliary air outlet channel (60).

4. The air outlet structure as claimed in claim 1, wherein the first air deflector (41) is provided with a zigzag structure.

5. The air outlet structure as claimed in claim 1, wherein the air outlet structure further comprises a drive motor (43), the drive motor (43) is connected with the first air deflector (41) in a driving manner, as to drive the first air deflector (41) to move to the first preset position or the second preset position.

6. The air outlet structure as claimed in claim 1, wherein the adjusting device (40) further comprises:

a second air deflector (42), provided at the main air outlet (20) in the foldable manner, wherein the second air deflector (42) is connected with the first air deflector (41) by a linkage rib assembly (80) in a transmission manner;

when the second air deflector (42) opens the main air outlet (20), the linkage rib assembly (80) drives the first air deflector (41) to move to the second preset position; and when the second air deflector (42) closes the main air outlet (20), the linkage rib assembly (80) drives the first air deflector (41) to move to the first preset position.

7. The air outlet structure as claimed in claim 6, wherein the linkage rib assembly (80) comprises:

a first linkage rib (81), provided on an end of the first air deflector (41);

a second linkage rib (82), provided on an end of the second air deflector (42), wherein the second linkage rib (82) is connected with the first linkage rib (81) in the transmission manner.

8. The air outlet structure as claimed in claim 6, wherein one end of the second air deflector (42) is provided with the linkage rib assembly (80) and another end of the second air deflector (42) is provided with another linkage rib assembly (80).

9. The air outlet structure as claimed in claim 6, wherein the second air deflector (42) is provided with multiple second air holes (47) for sending out the air.

10. An air flow control method for the air conditioner having the air outlet structure of claim 1, wherein the air flow control method comprises:

controlling the adjusting device (40), as to communicate the main air outlet channel (10) with the main air outlet (20) and disconnect the main air outlet channel (10) with the auxiliary air outlet (30), and accordingly make the air conditioner send out air through the main air outlet (20); or controlling the adjusting device (40), as to communicate the main air outlet channel (10) with the auxiliary air outlet (30) and disconnect the main air outlet channel (10) with the main air outlet (20), and accordingly make the air conditioner send out the air through the auxiliary air outlet (30); or controlling the adjusting device (40), as to communicate the main air outlet channel (10) with the auxiliary air outlet (30) and the main air outlet (20), and accordingly make the air conditioner send out the air through the auxiliary air outlet (30) and the main air outlet (20).

* * * * *